(12) United States Patent
Launchbury et al.

(10) Patent No.: US 8,145,900 B2
(45) Date of Patent: *Mar. 27, 2012

(54) CRYPTO-POINTERS FOR SECURE DATA STORAGE

(75) Inventors: John Launchbury, Beaverton, OR (US); Thomas Nordin, Munhall, PA (US)

(73) Assignee: Galois, Inc., Portland, OR (US)

( * ) Notice: Subject to any disclaimer, the term of this patent is extended or adjusted under 35 U.S.C. 154(b) by 1295 days.

This patent is subject to a terminal disclaimer.

(21) Appl. No.: 11/679,123

(22) Filed: Feb. 26, 2007

(65) Prior Publication Data

US 2007/0136607 A1    Jun. 14, 2007

Related U.S. Application Data

(62) Division of application No. 10/108,176, filed on Mar. 26, 2002, now Pat. No. 7,185,205.

(60) Provisional application No. 60/278,823, filed on Mar. 26, 2001.

(51) Int. Cl.
*H04L 29/06* (2006.01)

(52) U.S. Cl. ........ 713/162; 713/165; 713/166; 713/167; 380/277; 380/278; 380/280; 380/283; 380/28; 380/44; 380/46; 711/100

(58) Field of Classification Search ................. 713/189, 713/190, 162, 165–167; 707/609; 380/277–278, 380/280, 283, 28, 44, 46; 711/100
See application file for complete search history.

(56) References Cited

U.S. PATENT DOCUMENTS

| | | | |
|---|---|---|---|
| 4,698,617 A | | 10/1987 | Bauer |
| 4,941,176 A | * | 7/1990 | Matyas et al. ............... 380/280 |
| 5,058,164 A | | 10/1991 | Elmer et al. |
| 5,265,159 A | * | 11/1993 | Kung ............................ 713/193 |
| 5,563,945 A | | 10/1996 | Gercekci |
| 5,940,507 A | * | 8/1999 | Cane et al. .................... 713/165 |
| 5,970,496 A | * | 10/1999 | Katzenberger ........................ 1/1 |
| 5,987,572 A | | 11/1999 | Weidner et al. |
| 6,249,866 B1 | | 6/2001 | Brundrett et al. |
| 6,278,992 B1 | | 8/2001 | Curtis et al. |
| 6,304,948 B1 | | 10/2001 | Motoyama et al. |
| 6,314,437 B1 | | 11/2001 | Starek et al. |
| 6,347,318 B1 | | 2/2002 | Rokicki |
| 6,615,224 B1 | | 9/2003 | Davis |

(Continued)

OTHER PUBLICATIONS

International Preliminary Examination Report for PCT/US02/09426, dated Aug. 12, 2003.

(Continued)

*Primary Examiner* — Thanhnga B Truong
(74) *Attorney, Agent, or Firm* — Schwabe Williamson & Wyatt

(57) ABSTRACT

This disclosure relates to pairing of a different cryptographic key with each pointer in a data structure to form a crypto-pointer. The cryptographic key is used to encrypt the contents of all data stored at the physical location on the storage device indicated by the pointer. Preferably the only data accessible in an unencrypted form is contained in cells that are reachable from root-set crypto-pointers. Once the crypto-pointer associated with a particular memory cell is deleted, normally by overwriting or explicitly zeroing the crypto-pointer, the contents of the memory cell become inaccessible because the data stored at that cell is in encrypted form (cipher text) and the crypto-pointer that included the cryptographic key for decrypting the cipher text has been deleted from the system.

16 Claims, 5 Drawing Sheets

Each step in a chain of crypto-pointers uses a separate key.

U.S. PATENT DOCUMENTS

2002/0073326 A1    6/2002   Fontijn
2004/0139098 A1    7/2004   Margolus et al.
2006/0004897 A1    1/2006   Nadj et al.

OTHER PUBLICATIONS

Written Opinion for PCT/US02/09426, dated Feb. 14. 2003.

International Search Report for PCT/US02/09426, dated Jul. 24, 2002.

Recovery of Data Pages after Partial Page Writes, IBM Technical Disclosure Bulletin, vol. 34, Iss. 3, pp. 69-83, Aug. 1, 1991.

Vector Binary Search Algorithm, IBM Technical Disclosure Bulletin, vol. 22, Iss. 2, pp. 861-862, Jul. 1979.

\* cited by examiner

Figure 1. Structure of crypto-pointer

Figure 2. Crypto-pointer always points to cell encrypted with associated key

Figure 3. Each step in a chain of crypto-pointers uses a separate key.

Figure 4. Decrypting cell contents with Key A reveals subsequent crypto-pointers Figure 5. Discarding crypto-pointer C still permits indirect access to the C structure, via A again Figure 6. Discarding crypto-pointer A makes Data and the C structure forever inaccessible

CRYPTO-POINTERS FOR SECURE DATA STORAGE

RELATED APPLICATIONS

This application is a divisional of and claims priority to U.S. patent application Ser. No. 10/108,176, filed Mar. 26, 2002, which in turn claims the benefit of U.S. Provisional Patent Application 60/278,823, filed Mar. 26, 2001, all of which are incorporated herein by reference.

TECHNICAL FIELD

This disclosure relates to secure data storage and to preventing recovery of deleted data.

BACKGROUND

One way of storing data in a computer system is to store files in a directory structure. The directory structure normally includes a variety of information about any files and subdirectories within the directory structure. One piece of information included in the directory for each file or sub-directory is a directory listing that includes a field containing the physical location, or a pointer to a physical location, on a storage device, such as a disk drive or other non-volatile storage medium, where the file or sub-directory is located. Deletion of a file or sub-directory from the directory typically consists of removing only the directory listing. Once the directory listing has been deleted the system can no longer access the file or sub-directory because it does not know the physical location on the storage device for the file or sub-directory. However, the file or sub-directory is usually still stored on the storage device and can be recovered through the use of well known data recovery techniques.

One way to prevent recovery of deleted data is to explicitly zero, or overwrite, all data at the physical location pointed to by the directory listing. However, this can be a cumbersome process. Particularly, if there are large amounts of data stored on the storage device. The problem can be even more difficult in a heap data structure because it is generally not clear when data within the structure is discarded. In a conventional heap, data is only discarded when the data becomes inaccessible via the heap structure, i.e. an access path within the heap structure no longer includes any pointers to the data. Discarding data in this environment typically consists of deleting any pointer that includes the physical location of the data on a storage device. The data itself is generally not deleted. Due to the uncertainty as to when the pointers, which include the physical location of the data, is discarded it can be difficult and cumbersome to overwrite or zero the data at its physical location on the storage device.

SUMMARY

According to one embodiment, in a hierarchical digital heap data structure comprising a plurality of memory cells, a method prevents recovery of deleted data. The method obtains a first address of a first memory cell in the heap data structure, provides a first cryptographic key, and associates the first address and the first cryptographic key with one another so as to form a first logical entity defining a first crypto-pointer to the first memory cell. The method obtains a second address of a second memory cell in the heap data structure, provides a second cryptographic key different from the first cryptographic key, and associates the second address and the second cryptographic key with one another so as to form a second logical entity defining a second crypto-pointer to the second memory cell. The method encrypts first data and the second crypto-pointer using the first cryptographic key to form first cipher-data, stores the first cipher-data in the first memory cell, and when the first data is no longer needed, deletes the first crypto-pointer, thereby rendering the first data unrecoverable at the moment it becomes inaccessible.

According to another embodiment, a crypto-pointer logical entity for use in secure digital data storage consists of an address field that points to a corresponding cell in a digital data structure and a cryptographic key associated with the address field for encrypting data to be stored in the corresponding cell.

According to yet another embodiment, a crypto-pointer logical entity for use in secure digital data storage comprises an address field that points to a corresponding physical location available for storing digital data and a cryptographic key associated with the address field for encrypting data to be stored at the corresponding physical location.

According to still another embodiment, a secure method of digital data storage generates a first random key associated with a first address corresponding to a first cell of a memory and a second random key associated with a second address corresponding to a second cell of the memory. The method encrypts first data and stores the encrypted first data in the second cell using the second random key and encrypts second data, the second address, and the second key and stores the encrypted second data, the second address, and the second key in the first cell using the first random key.

According to yet another embodiment, a secure memory structure comprises a root set of pointers that provide at least one entrance point into the memory structure, wherein the root set of pointers includes a first crypto-pointer having a first encryption key and a first address corresponding to a first memory cell in the memory structure, and a second crypto-pointer having a second address corresponding to a second memory cell in the memory structure, wherein first data stored at the second address is encrypted with the second encryption key, and wherein second data and the second crypto-pointer are both stored at the first address and are encrypted with the first encryption key.

According to still another embodiment, a method of accessing encrypted data in a secure heap data structure maintains a root set of pointers in an unencrypted form outside of the secure heap. Within the root set of pointers, the method provides a first crypto-pointer associated with a first memory cell in the secure heap data structure, the first crypto pointer having a first address and a first key. The method accesses the encrypted data stored at the first memory cell by decrypting the data using the first key.

According to yet another embodiment, a method of accessing encrypted data in a secure data structure (a) retrieves encrypted data from a memory cell based on a crypto-pointer having an address field pointing to a physical location of the memory cell and a cryptographic key associated with the address field, (b) decrypts the retrieved data using the associated cryptographic key, (c) reveals additional crypto-pointers in the decrypted data. The method repeats steps (a), (b), and (c) using the additional crypto-pointers until no additional crypto-pointers are revealed, and reads the decrypted data.

According to still another embodiment, a method of limiting access to predetermined portions of a data structure based on a user's entry point into the data system grants a first user access to a first crypto-pointer, the first crypto-pointer having an address field pointing to a physical location of a first memory cell having stored data and a cryptographic key for decrypting the data stored in the first memory cell to form first unencrypted data, the first unencrypted data including a second crypto-pointer having an address field pointing to a physical location of a second memory cell and a cryptographic key for decrypting data in the second memory cell. The method grants a second user access to a third crypto-pointer, the third crypto-pointer having an address field pointing to a physical location of a third memory cell having stored data and a cryptographic key for decrypting the data stored in the third memory cell to form third unencrypted data, the third unencrypted data including the second crypto-pointer and a fourth crypto-pointer thereby granting the second user access to more memory cells than the first user.

According to yet another embodiment, a data structure comprises a first crypto-pointer having a first address field pointing to a corresponding first physical location for storing first data and a first cryptographic key associated with the first address field for encrypting the first data and a second crypto-pointer having a second address field pointing to a corresponding second physical location for storing second data and a second cryptographic key associated with the second address field for encrypting the second data. The encrypted versions of first data and the second crypto-pointer are stored in the first physical location. The first data and the second crypto-pointer are encrypted using the first cryptographic key so that the first data and the second crypto-pointer become unrecoverable upon deletion of the first crypto-pointer.

According to still another embodiment, a directed graph data structure comprises a set of nodes, each node corresponding to a memory cell containing encrypted data. The encrypted data includes, upon decryption, a crypto-pointer pointing to a separate memory cell and a key for decrypting additional encrypted data stored in the separate memory cell. The data structure comprises a plurality of root crypto-pointers, each root crypto-pointer pointing to at least one of the nodes and having a key for decrypting the encrypted data stored in the memory cell. The data structure comprises a plurality of access paths, each access path beginning with on of the root crypto-pointers and defined by the crypto-pointers of each node so that a first user process accessing the data structure via a first one of the root crypto-pointers can traverse a first group of nodes along a first access path and a second user process accessing the data structure via a second one of the root crypto-pointers can traverse a second group of nodes along a second access path.

Additional aspects and advantages will be apparent from the following detailed description of preferred embodiments, which proceeds with reference to the accompanying drawings.

DETAILED DESCRIPTION OF PREFERRED EMBODIMENTS

This disclosure relates to hierarchical data structures employing crypto-pointers in place of normal pointers. Crypto-pointers enable fine-grain crypto-protection by the use of vast numbers of distinct keys within a single data structure. Crypto-pointers solve key-management problems in terms of the data structure itself. The use of crypto-pointers helps to ensure that data becomes unrecoverable whenever it becomes inaccessible, i.e. data becomes unrecoverable whenever the crypto-pointer associated with the data is deleted.

This disclosure relates to the pairing of a unique cryptographic key with each pointer in a data structure to form a crypto-pointer. The cryptographic key is used to encrypt all data stored at the physical location on the storage device indicated by the pointer. In accordance with the present invention, preferably the only data accessible in an unencrypted form is a root set of crypto pointers that provide entry points into the data structure. Once the crypto-pointer associated with a particular data cell is deleted, normally by overwriting or explicitly zeroing the crypto-pointer, the particular data cell or cells that were pointed to by the crypto pointer become inaccessible because the data at those cells is in encrypted form (cipher text) and the crypto-pointer that included the cryptographic key that could have been used to decrypt the data has been deleted from the system.

A heap is a collection of cells within a portion of memory, where the cells may contain data, pointers (which are memory addresses to other cells), or a combination of both. In a normal heap structure, blocks of memory in one or more storage devices are allocated and freed in an arbitrary manner. The heap structure typically includes a set of root pointers. Each of the root pointers includes information about a memory block within the heap structure including the physical location of the memory block on a storage device. The root pointer provide entry points into the heap structure. The memory blocks pointed to by the root pointers can include data, additional pointers, or both. In that way the heap structure can take on a tree structure, or a graph structure. A memory block is freed when no other memory blocks accessible from one of the entry points includes a pointer to that memory block. At that point, a garbage collector can identify that the memory block is no longer needed and the memory block can be allocated for storage of new data. However, until new data is written to a particular memory block the old data stored at that physical location is preserved and can be accessed via known data recovery techniques.

Figure 1:
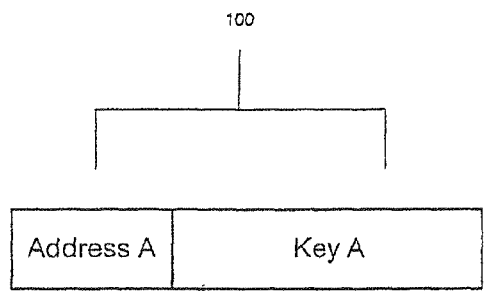
FIG. 1 is a block diagram depicting the logical structure of a crypto-pointer.

In accordance with one embodiment a secure data structure can be formed by using "crypto-pointers" instead of normal pointers. A crypto-pointer includes an address, much like a normal pointer, which indicates the physical location on a non-volatile storage device where data has been, or will be, stored. In a crypto-pointer the address is paired with a cryptographic key. FIG. 1 is a block diagram depicting a crypto-pointer 100 in accordance with the present invention. With reference to FIG. 1, an address A is paired with an encryption Key A to form crypto-pointer 100. Crypto-pointer 100 is a single logical entity and should preferably always be manipulated or handled as a single entity.

Figure 2:
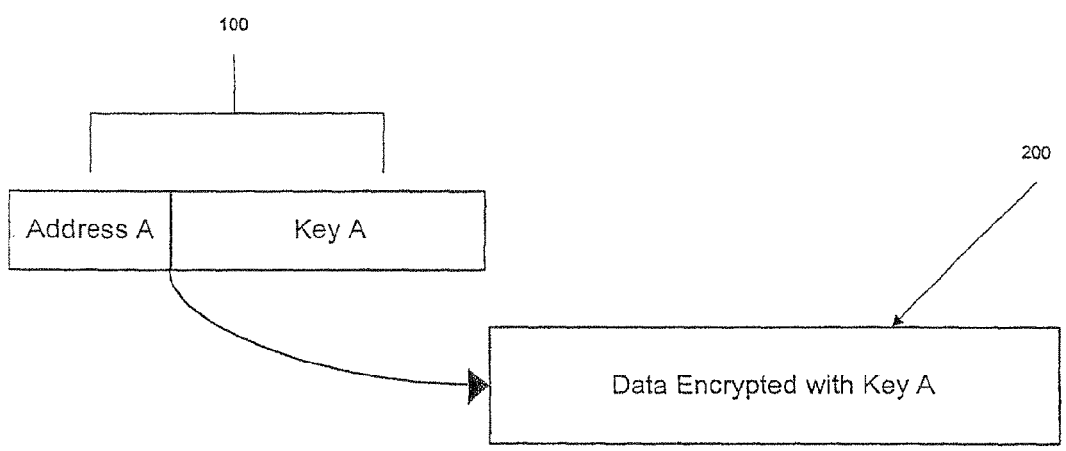
FIG. 2 is a block diagram depicting the association of the crypto-pointer of FIG. 1 with encrypted data stored in memory at a location indicated by an address field of the crypto-pointer.

FIG. 2 is a block diagram depicting the association between crypto-pointer 100 and data stored in a memory cell 200 on a storage device (not shown). The physical location of memory cell 200 on the storage device corresponds to the location indicated by address A. With reference to FIG. 2, data to be stored at memory cell 200 is always encrypted using encryption key A and an appropriate encryption algorithm to form a cipher-text version of the data. The cipher-text version of the data is then stored at memory cell 200. In order to access a plain text version of the data stored at memory cell 200 the cipher-text version of the data must be decrypted using encryption Key A and an appropriate decryption algorithm.

Ensuring that only cipher-text versions of data are stored in memory cells on a storage device has implications for allocating, updating, and reading the data stored in a memory cell. First, whenever a new memory cell is allocated, the address is recorded, a new random encryption key is generated, and the random encryption key is associated with the address to form a new crypto-pointer. The new random encryption key is used to encrypt all initial contents of the new memory cell. Second, whenever the memory cell content needs to be updated, the random encryption key of the crypto-pointer is used to encrypt the new content (whether data, other crypto-pointers, or a combination of both), and the memory cell is overwritten with the updated encrypted information. Conversely, whenever the memory cell pointed to by the crypto-pointer is to be read, the random cryptographic key is used to decrypt the data stored at the address, also called the cipher-text, thus revealing the plain text data stored at the address. Whatever information this cell contains (again, whether data or other crypto-pointers), becomes known only after decryption.

Figure 3:
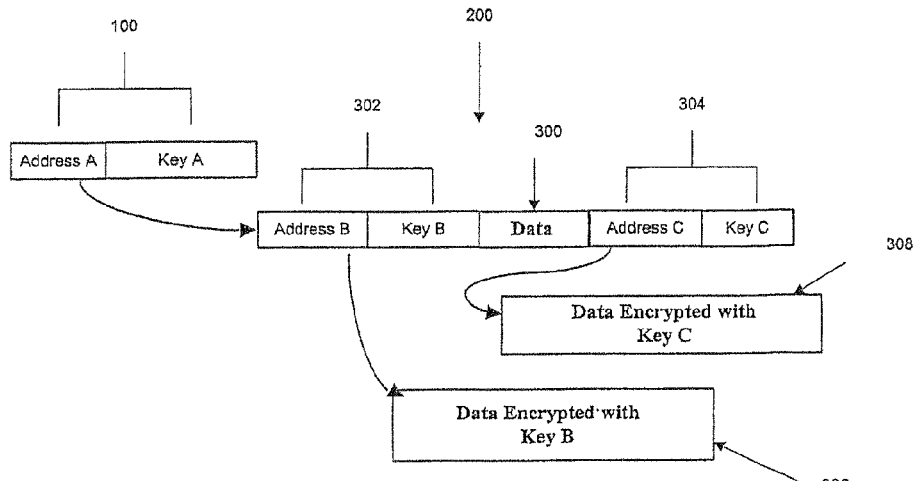
FIG. 3 is a block diagram depicting how a crypto-pointer A enables access to data associated with crypto-pointers B and C.

In a preferred embodiment each memory cell has its own unique encryption key as shown in FIG. 3. With reference to FIG. 3, the plain text version of the data stored at memory cell 200 can only be accessed by decrypting the stored cipher-text using encryption key A and an appropriate decryption algorithm. The plain text contents include data 300, crypto-pointer 302 and crypto pointer 304. Crypto pointer 302 comprises an Address B and an encryption Key B and is associated with a memory cell 306. Crypto pointer 304 comprises an Address C and an encryption Key C and is associated with a memory cell 308. By associating each memory cell with its own crypto-pointer a user can only access the plain text version of data stored at a memory cell if the user has the appropriate crypto-pointer for that memory cell.

If the memory cell is small enough, the key itself may be used directly for encryption and decryption by combining it with the cell contents using an exclusive-OR operation. Preferably, however, a stream cipher should be used to generate a stream of bits long enough for encrypting the data to be stored at the memory cell. Depending on the performance requirements of a particular application, the cryptographic operations may be implemented in either software, or hardware, or a combination of both. The ideal size of any encryption keys will depend on the desired security constraints for the application. In the most sensitive applications, a block-cipher method such as Rijndael or RC6 may be desirable.

If an additional reference to a cell is required, it can be produced only by copying an existing crypto-pointer (both the address and the cryptographic key fields are copied). Simply generating a regular pointer (computing the address of a memory cell by pointer arithmetic for example), will allow only the encrypted contents of that cell to be accessed. Because it lacks the associated cryptographic key, the generated regular pointer does not allow a user to obtain a plain text version of the contents of the memory cell.

Whenever a crypto-pointer is discarded, both the address and the cryptographic key are physically overwritten. Overwriting in this sense is typically accomplished by either zeroing both fields, the address and the cryptographic key, if the crypto-pointer is being set to nil, or by overwriting both fields with another crypto-pointer.

Figure 4:
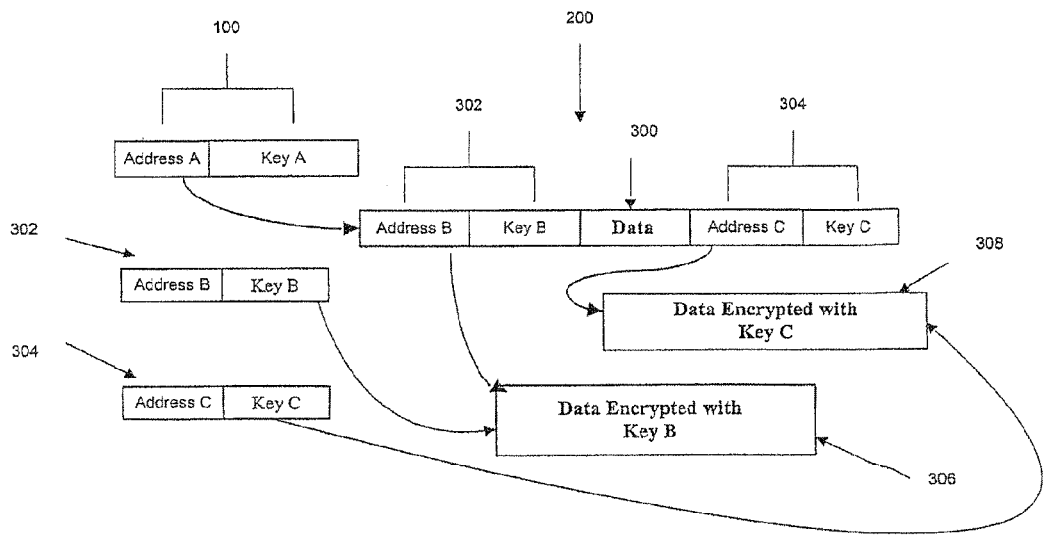
FIG. 4 is a block diagram of a simple data structure with three access points, each of which is associated with a plain text version of a different crypto-pointer.

Heap structures, as mentioned above, typically use a root-set to define any entry points into the structure. Similarly, according to one embodiment, a secure heap has a root set consisting of one or more crypto-pointers, which are maintained in an unencrypted form (in contrast to any crypto-pointers that may be embedded within the heap). The heap can be traversed starting from any one of these root crypto-pointers by successively retrieving keys and decrypting cells at each step within the heap as shown in FIG. 4. In this way, transitive access to the contents of all descendant cells is possible. With reference to FIG. 4, the root set of crypto-pointers includes crypto-pointer 100, crypto-pointer 302, and crypto-pointer 304. A user that begins traversing the data structure with crypto-pointer 100, of the root set, can gain access to the data associated with crypto-pointer 302 and crypto-pointer 304 because the plain text version of the data associated with crypto-pointer 100 includes, as discussed above, a plain text copy of both crypto-pointer 302 and crypto pointer 304. A user that begins traversing the data structure with crypto-pointer 302 of the root set of crypto-pointers can only gain access to a plain text version of the encrypted data associated with crypto-pointer 302, which is stored at memory cell 306. Likewise, a user that begins traversing the data structure with crypto-pointer 304, of the root set of crypto-pointers, can only gain access to the plain text version of the encrypted data associated with crypto-pointer 304, which is stored at memory cell 308.

Figure 5:
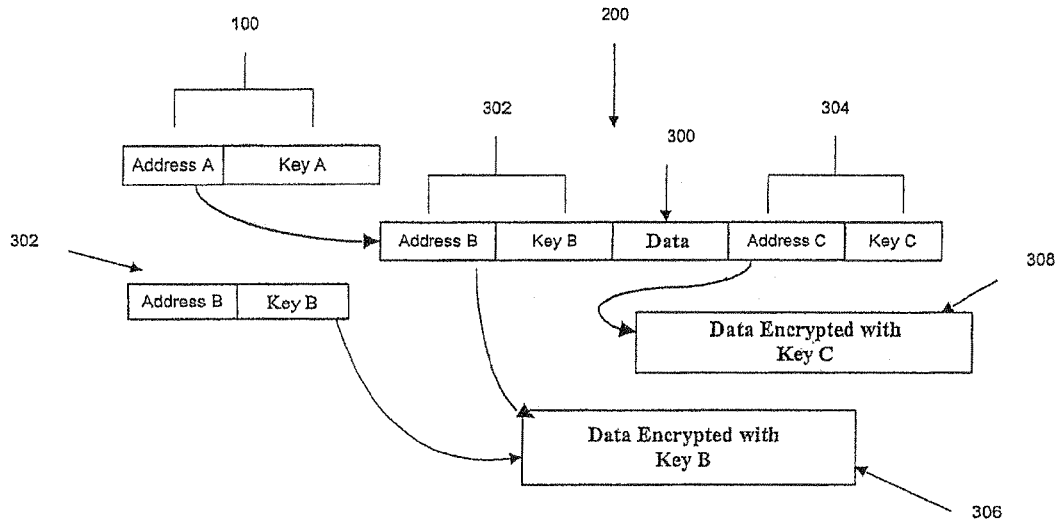
FIG. 5 shows the data structure of FIG. 4 after the plain text version of crypto-pointer C has been deleted.

It is often the case that a cell in the heap is connected to the root-set by many access paths. As crypto-pointers in these access paths are duplicated, the number of alternative access paths to any given cell may increase. Conversely, as crypto-pointers are deleted the number of possible access paths decreases, though the cell may still remain accessible FIG. 5 shows the data structure of FIG. 4 after crypto-pointer 304, of the root set of crypto-pointers, has been deleted. With reference to FIG. 5, the plain text data associated with crypto-pointer 304 is now only accessible to a user who begins traversing the data structure with crypto-pointer 100, because the root set version of crypto-pointer 304 is no longer available. The access paths to the data associated with crypto-pointer 302 remain unchanged from FIG. 4.

Figure 6:
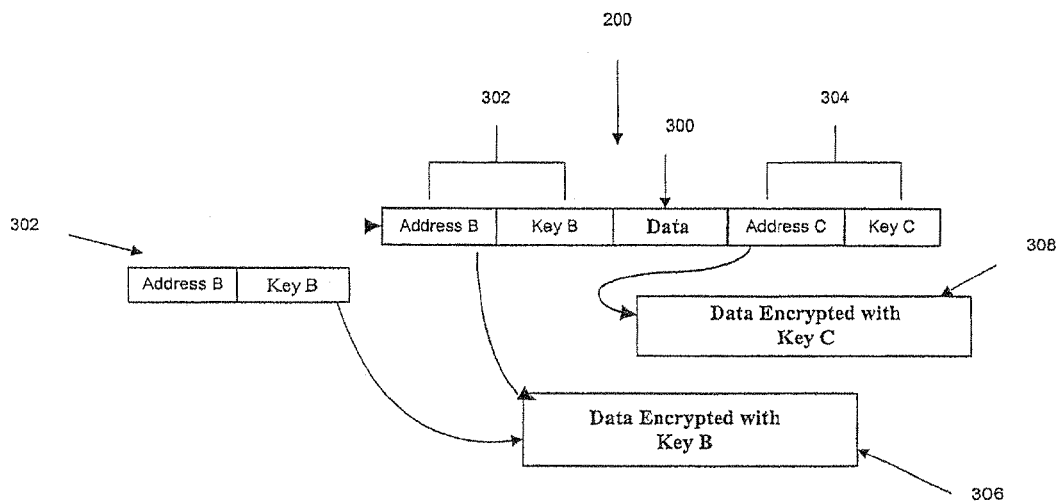
FIG. 6 shows the data structure of FIG. 5 after the plain text version of crypto-pointer A has been deleted.

Ultimately, deletion of crypto-pointers may eliminate all access paths, causing a cell to become disconnected from the root-set. Once this happens, no plain text version of its associated cryptographic key exists, nor can a plain text version of the associated cryptographic key be obtained, short of breaking the cryptography. Therefore, the contents of the cell can no longer be decrypted, short of breaking the encryption algorithm or performing a brute force search of the key space. FIG. 6 show the data structure of FIG. 5 after crypto-pointer 100 has been deleted from the root set of crypto-pointers. With reference to FIG. 6, the data associated with crypto-pointer 304 is no longer available because the data structure no longer includes a path through which a user can access the data that was associated with crypto-pointer 304. Once crypto-pointer 100 was deleted the encrypted data associated with crypto-pointer 100 became inaccessible because encryption key A was no longer available. As a result a plain text version of crypto-pointer 304 can no longer be obtained from the encrypted data associated with crypto-pointer 100 and a user is left with no way to access encryption key C and no way to decrypt the encrypted data stored at memory cell 308. Likewise, a user can no longer access data 300 that was stored at memory cell 200 because the user no longer has access to encryption key A. However, the data stored at memory cell 306 is still accessible because the root set still includes a plain text version of crypto-pointer 302 giving the user access to encryption key B which can be used with an appropriate encryption algorithm to generate a plain text version of the data stored at memory cell 306.

Figure 7:
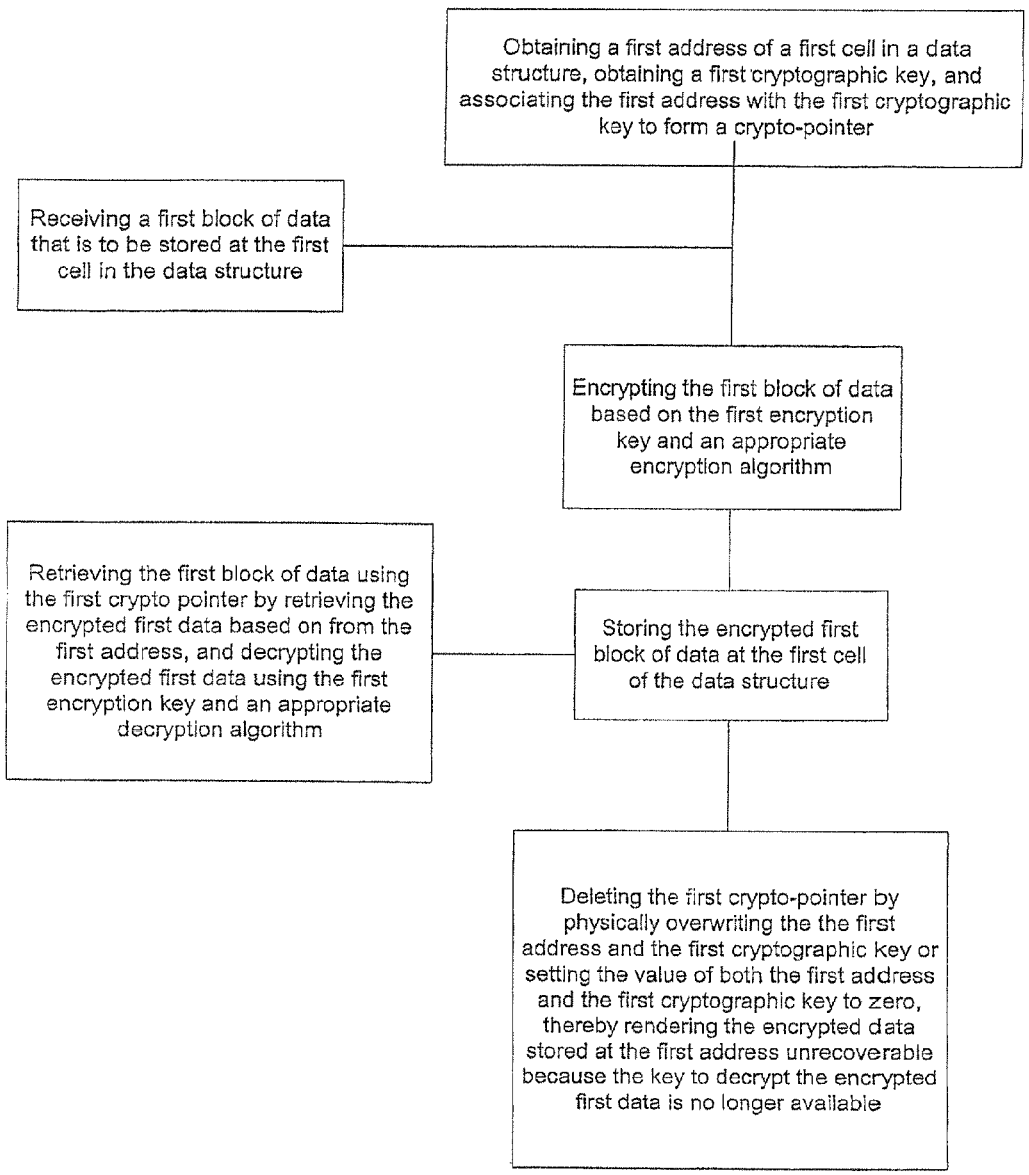
FIG. 7 is a flow chart depicting a method of using crypto-pointers.

FIG. 7 is a flow chart showing a method of using crypto-pointers to create a secure data structure. With reference to FIG. 7, a computer system, or user, obtains a first address of a first memory cell in the data structure. The first address is then associated with a first cryptographic key to form a first crypto-pointer. The cryptographic key can be of any length deemed appropriate for the sensitivity of the data to be stored in the data structure. When the system, or user, receives a first block of data to be stored at the first memory cell it encrypts the first block of data using the first encryption key, and an appropriate encryption algorithm, prior to storing the first block of data at the first memory cell. In order to access a plain text version of the first block of data, the system must use the first crypto pointer to access the first memory cell. The system retrieves the encrypted first block of data using the first address and decrypts the encrypted first block of data using the first encryption key and an appropriate encryption algorithm. When the first block of data is no longer needed, then the system deletes the first crypto pointer, preferably by either setting both the address and key fields to zero or by overwriting the first crypto-pointer with a new crypto pointer having a new address and a new cryptographic key. Once the first crypto-pointer has been deleted in this manner the encrypted first block of data can not be accessed by the system. In addition, the first block of data cannot be recovered using data recovery techniques because those techniques would only recover the encrypted version of the first block of data. In order to have access to a plain text version of the first block of data one would need to break the encryption scheme.

Taking this to a more complex example, if a memory cell X (not shown) is disconnected from a root set of pointers (not shown), then any other memory cell (not shown) which, when decrypted has a plain text crypto-pointer pointing to memory cell X must also be disconnected from the data structure (not shown), such that there are only encrypted versions of the crypto-pointer pointing to memory cell X stored on the system and there are no paths in the data structure through which a user may obtain a plain-text version of the crypto-pointer pointing to memory cell X. Even though encrypted versions of crypto-pointers pointing to memory cell X may remain in memory, those encrypted versions of crypto-pointers pointing to memory cell X can not be decrypted, so the encryption key to decrypt the data stored at memory cell X can not be recovered unless the encryption scheme is broken. In effect, any memory cell whose corresponding crypto-pointer has been deleted from the heap appears to be random noise to known data recovery techniques.

The contents of a normal computer storage disk (hard disk drive, floppy disk, CD, DVD, etc.) are normally arranged as a directory tree. A directory of this type can be viewed as a memory cell that contains a directory listing for each object (file or sub-directory) "within" the directory. The directory listing for an object includes information about the object such as the object's physical location on the storage disk plus other information particular to the object itself. The physical location of the object corresponds to a normal pointer, as discussed above, and plays a similar role. Deletion of an object normally consists only of removal of the object's directory listing from the directory. With deletion in this manner, the object itself is still stored at the physical location on the storage disk that was pointed to by the directory listing and can be recovered by well known data recovery techniques.

The contents of a computer storage disk can be made secure by modifying the organization of information on the storage disk such that all directory pointers (i.e. information about each object's physical location on a storage device) are replaced with crypto-pointers, as described above. In accordance with a presently preferred embodiment all data stored at the physical location on the computer storage disk pointed to by the address field of a particular crypto-pointer is encrypted with the encryption key field of that particular crypto-pointer. In this way, when the directory listing for an object, a program or subdirectory, is deleted and overwritten the data stored at the physical location on the computer storage disk pointed to by the crypto-pointer associated with the directory listing for the object is rendered unrecoverable because the key to decrypt the data is not available to the system. Unlike in other approaches, there is preferably no master key for the disk that would reveal all the (current and old) data it may contain. Unless the encryption is broken, only data accessible by an existing path in the directory structure can be decrypted.

To gain access to the contents of the file-store, a user must have access to a plain text version of a root crypto-pointer. Preferably the root crypto-pointer should be treated with a level of care similar to that used for normal cryptographic keys. Preferably the root crypto-pointer will only be distributed according to a known certificated key-management process.

Because file deletion within a crypto-pointer computer storage system is permanent, this form of organizing disk storage should be used with caution and preferably only in situations where accidental deletion of files is unlikely to occur, or where backup copies of deleted directory listings are maintained for some period of time. A preferred way to minimize unintentional deletion is to copy all deleted directories into a trash directory, while deleting the actual directory entry. Deleted listings would then remain in the trash directory for a period of time, thus allowing users an opportunity to recover unintentionally deleted files. Preferably users would need to manually empty their trash directory, at which point the user should be advised that non-reversible deletion is about to occur. Alternatively, the trash directory could be set to automatically empty itself of deleted directory listings on a periodic basis.

In addition, in order to maintain the unrecoverability of files whose directory listing has been deleted, symbolic links, such as shortcuts or aliases, must preferably not be implemented as crypto-pointers. If symbolic links were implemented as crypto-pointers then the existence of a symbolic link to a file whose directory listing has been deleted would maintain a decryption path for the otherwise deleted files. To address this concern, symbolic links should be represented as a path description that a file manager application uses to traverse the directory hierarchy, starting from the root set of pointers for the disk. Of course, if hard links across the directory hierarchy are to be permitted by design, then the directory structure becomes a graph rather than a tree, and deletion occurs only when a file is no longer accessible from a root entry point into the disk.

The organizational structure described above provides an additional benefit when distributing a large body of information (whether program source-code, object-code, business documents, data, or families of task-specific cryptographic keys etc.) to a variety of users who may need access to different portions of the information. The body of information can be graph-structured according to an appropriate information-release policy, laid out on a DVD (or CD), and distributed widely. Access to portions of the information graph is enabled by providing each individual user with the relevant crypto-pointer that unlocks the information they are permitted to see, and therefore, to all the descendent information also. The desired access policy is embodied in the graph structure. With suitable care in the design of that structure, each user would need only one single entry point into the graph. Any portion of the DVD not accessible via a users entry point into the graph remains cryptographically secure from that user. If a user's permissions change (through purchasing an upgrade, for example) then the vendor need only supply another crypto-pointer to provide access to a previously unreadable portion of the DVD.

Figure 8:
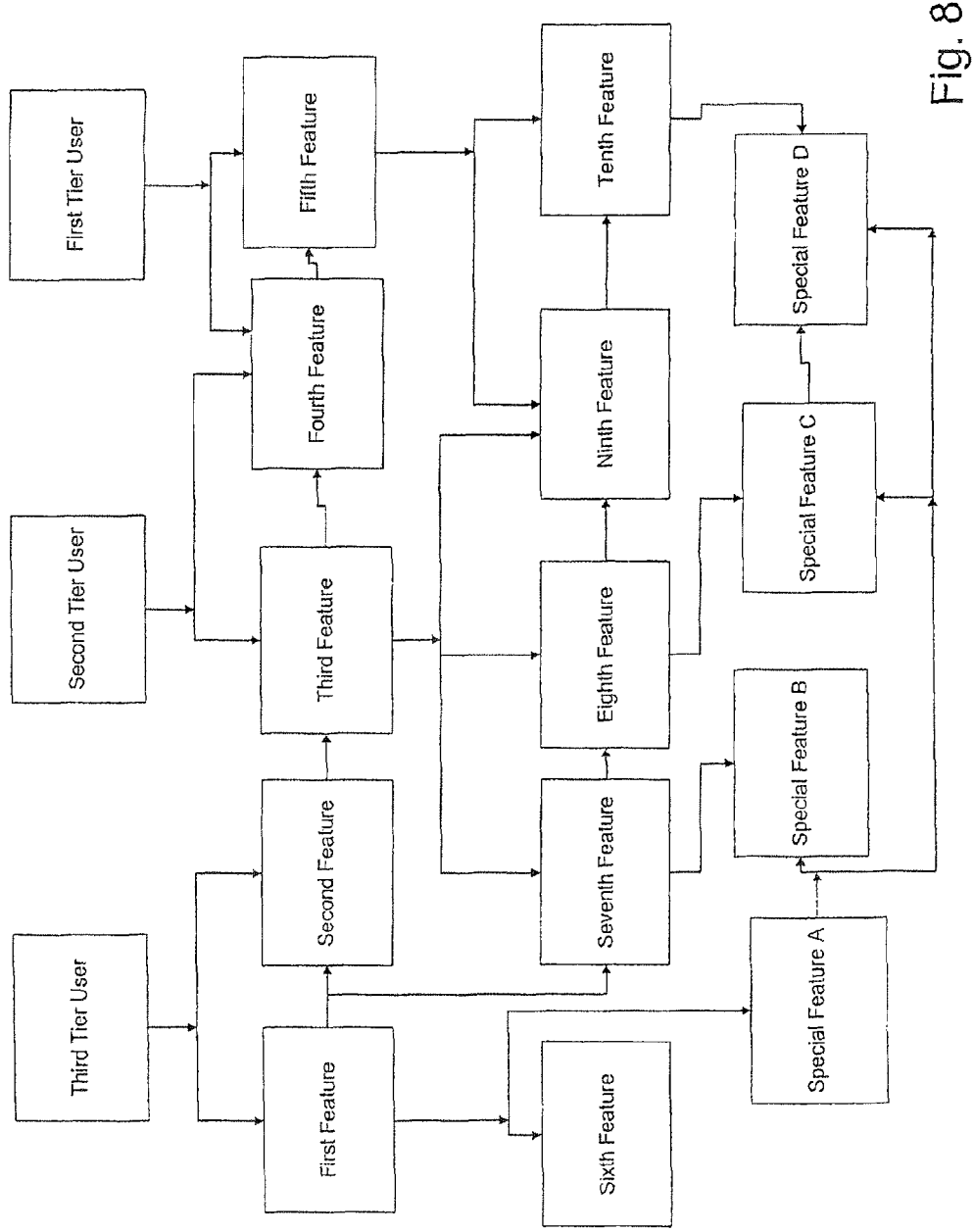
FIG. 8 is a block diagram depicting a data structure using crypto-pointers to limit access to portions of the data structure based on the point of entry into the data structure.

FIG. 8 is a block diagram illustrating a graph data structure limiting access based on a user's entry point into the data structure, as described above. With reference to FIG. 8, the arrows between boxes represent an access path between the data corresponding to the boxes that only works in the direction of the arrow, i.e. the box attached to the tail of the arrow represents data that when decrypted includes a crypto-pointer pointing to the data that corresponds to the box attached to the head of the arrow. An access path in this context means that the unencrypted data corresponding to a box (representing a directory listing or crypto-pointer) attached to the tail of the arrow includes a plain text version of a crypto-pointer pointing to the encrypted data corresponding to a box in the graph attached to the head of the arrow. For example, data stored in a memory cell corresponding to a box labeled first feature includes a copy of a crypto-pointer pointing to a second feature, a sixth feature and a special feature A. Thus when a user has access to a plain text version of the data corresponding to first feature that user also has plain text crypto-pointers corresponding to second feature, sixth feature, and special feature A.

With reference to FIG. 8, a first tier user has a root crypto-pointer that allows the first tier user to access plain text crypto-pointers corresponding to a fourth feature and a fifth feature. Once data stored at a location pointed to by the crypto-pointer corresponding to the fifth feature has been decrypted based on its encryption key the first tier user will be have a plain text version of a crypto-pointer pointing to a ninth feature and a crypto-pointer pointing to a tenth feature, as shown in FIG. 8. First tier user gains access to ninth and tenth features because fifth feature includes, among other things, a plain text version of crypto-pointers that correspond to ninth and tenth features. Finally, first tier user can access a special feature D because the decrypted version of the data corresponding to the tenth feature's crypto-pointer includes a plain text version of a crypto-pointer corresponding to special feature D. As shown in FIG. 8, first tier user has no access paths to first, second, third, sixth, seventh, and eighth features. Likewise, first tier user does not have access to special features A-C because the entry point into the data structure employed by first tier user does not allow the first tier user to gain access to a plain text version of the crypto-pointers associated with those features. Even if first tier user knows the physical location on the storage disk of any inaccessible features, first tier user can not access those features without defeating the encryption.

A second tier user on the other hand has access to third, seventh, and eighth features, in addition to the numbered features that the first tier user can access. The second tier user also has access to special features B and C as well as special feature D. The third tier user in this example has complete access to all the features within the data structure.

Other examples of applications that can be secured with a data structure as described above are as follows: Hard-disk drives with built-in clean-delete features; Hard-disk drives, for which multiple users have root access, permitting individuals private access to their own areas, group access to appropriate group spaces, and universal access to common spaces for all users; Software disk-drivers (for LINUX, Windows etc.) that implement clean-delete on standard disk drives; Software disk-drivers to enable multiple users to maintain private space on a shared disk; DVDs and CDs with enforced information-release policies.

Applications of crypto-pointers in heap data structures, as described above, include programs that manipulate tree-structured or graph-structured data. This includes heap-based implementations of object-oriented languages such as Java, or C++, and heap-based implementations of functional languages, such as Haskell.

In the course of executing a Java program, regardless of whether the platform is a smart card or a supercomputer, new objects are created all the time, and connections between objects are maintained using traditional pointers. When an object is no longer accessible, it remains physically in memory (along with all its internal storage) until a garbage collector reclaims the space. Even then, depending on the design of the particular garbage collector, the cell contents may not have been erased. Even when the physical space that corresponded to a "deleted" object is reused some part of the "deleted object" might remain stored in memory if the new object is smaller than the "deleted" object.

Within this context, replacing the normal pointers associated with each object with crypto-pointers alleviates this problem. The object, including its internal storage, is stored in an encrypted format at its physical location in the heap. Only when the object is accessed using a copy of it's valid crypto-pointer can the contents of the object be decrypted into a plain text version that can be used and understood. While this might impose a dramatic efficiency overhead if the cryptography is done in software, performing it in hardware can make the cost reasonable.

Special care is needed to deal with an execution stack in this environment. If a traditional stack is used, then a set of unencrypted crypto-pointers will exist in memory. Depending on the security level of the application, this may be fine, so long as any crypto-pointer on the top of the stack is overwritten each time the stack is popped. In more stringent situations, the stack should be broken up into a linked list of encrypted stack frames, each link in the list being a crypto-pointer. Example applications of crypto-pointers in this area include the following: Secure Java, by using crypto-pointers instead of ordinary pointers de-allocated objects will not remain accessible; Secure Java smart cards; Secure Haskell (and other functional languages), using crypto-pointers instead of normal pointers results in a heap in which discarded data can not be accessed without breaking the encryption; Secure C, where pointer arithmetic works within the context of a defined array structure only (the key is a fixed function of the base key and the increment), but pointer arithmetic fails to produce the correct key if the structure is overrun; Graph-algorithms, where the data is sensitive, and the graph evolves over time, deleting the pointer to portions of information as those portions become unneeded results in the discarded data being inaccessible unless the encryption is broken.

In addition, crypto-pointers may be used in an Internet, intranet, or any network context where resources are shared.

In a network environment a crypto-pointer will have the same fields as described above, an address field and a key field. In this context the address field corresponds to a Uniform Resource Locator (URL) or other scheme for locating or identifying network resources. The key field, as above, is a cryptographic key used to encrypt and decrypt the information pointed to by the address field. For example, the key is used to decrypt the web page or ftp file after download, and the key would also be used to encrypt information prior to uploading that information to the address. This provides users with a way to store sensitive data in a distributed environment when the network is untrusted, and also when the storage nodes are untrusted. The storage nodes only store encrypted information, and in a preferred embodiment the storage nodes do not receive a decryption key. Moreover, once the crypto-pointer is deleted, such as removing and physically overwriting the URL crypto-pointer from all network machines that had a copy, an untrusted storage node will have nothing to gain by maintaining a copy of the encrypted page in the hope that the key will be compromised because the encryption key for that page is unrecoverable.

As far as the network is concerned, the only plain text visible to potential network snoopers are hyperlinks; all other traffic is encrypted. Possession of a hyperlink is equivalent to possession of a pointer address without the corresponding encryption key. Thus, the use of crypto-URLs (URLs paired with cryptographic keys, used in the manner described above) provides a viable technique for securing sensitive data stored in a networked environment, including data such as health and financial records. The sensitive data is maintained in a heap-structured manner, and as a result any individual piece of sensitive data can only be accessed by following the official structure of the database. A user attempting to access the sensitive information will normally also have to satisfy whatever additional authorization mechanisms that an administrator chooses to impose on the database structure. Preferably, the database structure is implemented with no "back doors" through which an unauthorized user can access the sensitive information.

A similar technique can be implemented on a smaller scale, such as a single computer. With proper management of a root set of crypto-pointers, a set of heap traversal procedures can be implemented so that unencrypted crypto-pointers do not leave the on-chip registers of the central processing unit. In this way, a secure heap can be suitable for situations in which the internal security of a computer questionable.

In an alternative implementation crypto-pointers are combined with regular pointers to build a mixed data structure. In this embodiment, portions of the data structure are stored in plain text format and the directory listing for these unsecured portions of the data structure includes only a pointer to the physical location of the data. While, other portions of the data structure are implemented using crypto-pointers such that the corresponding data is stored in encrypted format and the directory listings corresponding to the data stored in encrypted format include crypto-pointers corresponding to the encrypted data. In this context, regular URLs can be included in secure web pages, and may be followed in the usual way. Preferably, the unsecured portions of the mixed data structure should not contain plain text crypto-pointers because the data to which they point would then also be public, and the cryptography would provide no additional security.

Other examples of applications that can be secured with a data structure as described above are as follows: Distributed storage of sensitive information on untrusted hosts; Individualized record access for financial or health records, wherein by providing an additional authorization key in the encrypted page, a user who has a key to access a record (and hence can decrypt it) can also gain access to the authorization key to enable information update; Manipulation of secure data in machines vulnerable to physical probing.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A secure method of digital data storage comprising the steps of:
   generating a first cryptopointer including a first random key and a first address, wherein the first random key is associated with the first address and the first address corresponds to a first cell of a memory;
   generating a second cryptopointer including a second random key and a second address, wherein the second random key is associated with the second address and the second address corresponds to a second cell of the memory;
   encrypting first data and storing the encrypted first data in the second cell using the second random key; and
   encrypting second data, the second address, and the second key and storing the encrypted second data, the second address, and the second key in the first cell using the first random key.

2. A secure method of digital data storage according to claim 1 and further comprising updating the first memory cell contents by:
   obtaining new data for storage in the first cell;
   encrypting the new data using the first random key; and
   overwriting a portion of the first cell contents with the encrypted new data.

3. A secure method of digital data storage according to claim 1 further comprising:
   reading the first cell contents by retrieving the encrypted second data, second address, and second key and decrypting the retrieved encrypted second data, second address, and second key first using the first random key; and
   reading the second cell contents by retrieving the encrypted first data and decrypting the retrieved encrypted first data using the decrypted second random key.

4. A secure method of digital data storage according to claim 1 wherein said encrypting the second data, the second address, and the second key for storage in the first cell using the first random key comprises a Boolean exclusive-OR (XOR) operation.

5. A secure method of digital data storage according to claim 1 wherein said encrypting the second data, the second address, and the second key for storage in the first cell using the first random key comprises using the first random key in conjunction with a predetermined encryption algorithm to encrypt the second data, the second address, and the second key, thereby producing a cipher-text version of the second data, second address, and second key.

6. A secure method of digital data storage according to claim 1 wherein the encryption operation is implemented in software.

7. A secure method of digital data storage according to claim 1 wherein the encryption operation is implemented in hardware.

8. A secure method of digital data storage according to claim 1 and further comprising:

exclusively storing data encrypted by the first key in the first cell while the first crypto-pointer exists.

9. A secure method of digital data storage according to claim 1 and further comprising:
generating a plurality of crypto-pointers, including the first and second cryptopointers, that correspond to a respective plurality of memory cells.

10. A secure method of digital data storage according to claim 1, wherein the first random key is exclusively associated with the first address and the second random key is exclusively associated with the second address.

11. A secure memory structure of a storage device comprising:
a root set of pointers that provide at least one entrance point into the memory structure of the storage device,
wherein the root set of pointers includes a first crypto-pointer having a first encryption key and a first address corresponding to a first memory cell in the memory structure, and a second crypto-pointer having a second encryption key and a second address corresponding to a second memory cell in the memory structure,
wherein first data stored at the second address is encrypted with the second encryption key, and
wherein second data and the second crypto-pointer are both stored at the first address and are encrypted with the first encryption key.

12. A secure memory structure according to claim 11 wherein the root set of pointers are distributed according to a key authentication scheme.

13. A secure memory structure according to claim 11 wherein the memory structure comprises a memory heap.

14. A secure memory structure according to claim 11 wherein the memory structure comprises a graph data structure.

15. A secure memory structure according to claim 11 wherein the memory structure comprises a directory tree structure.

16. A method of accessing encrypted data in a secure heap data structure comprising:
maintaining, by a computer system, a root set of pointers in an unencrypted form outside of the secure heap;
within the root set of pointers, providing, by the computer system, a first crypto-pointer associated with a first memory cell in the secure heap data structure, the first crypto pointer having a first address and a first key;
accessing, by the computer system, the encrypted data stored at the first memory cell by decrypting the data using the first key, and wherein the decrypted data includes a second crypto-pointer associated with a second memory cell in the secure heap data structure, the second crypto-pointer having a second address and a second key; and
accessing the encrypted data stored at the second memory cell by decrypting the data using the second key.

* * * * *